United States Patent
Mather et al.

(10) Patent No.: US 9,422,393 B2
(45) Date of Patent: Aug. 23, 2016

(54) WATER-TRIGGERED SHAPE MEMORY OF PCL-PEG MULTIBLOCK TPUS

(71) Applicants: Patrick T. Mather, Manlius, NY (US); Gu Xinzhu, East Syracuse, NY (US)

(72) Inventors: Patrick T. Mather, Manlius, NY (US); Gu Xinzhu, East Syracuse, NY (US)

(73) Assignee: Syracuse University, Syracuse, NY (US)

( * ) Notice: Subject to any disclaimer, the term of this patent is extended or adjusted under 35 U.S.C. 154(b) by 49 days.

(21) Appl. No.: 14/079,171

(22) Filed: Nov. 13, 2013

(65) Prior Publication Data

US 2014/0135454 A1 May 15, 2014

Related U.S. Application Data

(60) Provisional application No. 61/725,970, filed on Nov. 13, 2012.

(51) Int. Cl.
*C08G 18/48* (2006.01)
*C08G 18/77* (2006.01)
*C08G 18/40* (2006.01)
*C08G 18/42* (2006.01)

(52) U.S. Cl.
CPC ........ *C08G 18/4833* (2013.01); *C08G 18/4018* (2013.01); *C08G 18/4277* (2013.01); *C08G 18/771* (2013.01); *C08G 2280/00* (2013.01)

(58) Field of Classification Search
CPC ........... C08G 18/4277; C08G 18/4833; C08G 2280/00
USPC ....................................................... 525/454
See application file for complete search history.

(56) References Cited

U.S. PATENT DOCUMENTS

| | | | |
|---|---|---|---|
| 6,221,997 B1 * | 4/2001 | Woodhouse et al. ........... 528/61 |
| 7,091,297 B2 * | 8/2006 | Mather et al. .................... 528/28 |
| 8,815,054 B2 * | 8/2014 | Ostendorf et al. ............ 162/109 |
| 2005/0216074 A1 * | 9/2005 | Sahatjian et al. ............. 623/1.11 |
| 2005/0245719 A1 * | 11/2005 | Mather et al. .................... 528/60 |
| 2009/0035350 A1 * | 2/2009 | Stankus .................. A61L 27/18 424/424 |
| 2010/0256777 A1 * | 10/2010 | Datta et al. .................. 623/23.72 |
| 2011/0021097 A1 * | 1/2011 | Mather ..................... C08J 5/046 442/60 |
| 2011/0125108 A1 * | 5/2011 | Deviere ........... A61B 17/06066 604/272 |
| 2011/0223664 A1 * | 9/2011 | Yun et al. ....................... 435/375 |
| 2011/0262504 A1 * | 10/2011 | Deleersnyder et al. ........ 424/401 |
| 2011/0263808 A1 * | 10/2011 | Mather et al. .................... 528/18 |
| 2013/0196003 A1 * | 8/2013 | Bluecher et al. .............. 424/725 |
| 2014/0135454 A1 * | 5/2014 | Mather et al. ................. 525/418 |

FOREIGN PATENT DOCUMENTS

CN 102174251 A * 9/2011
CN 102181066 A * 9/2011

OTHER PUBLICATIONS

Chung et al. "Thermoresponsive Shape Memory Characteristics of Polyurethane Electrospun Web". Journal of Applied Polymer Science, vol. 120, 492-500 (2011). DOI 10.1002/app.33167. Published online Oct. 19, 2010.*

Zhang and Zhang et al. "Shape memory polymer nanofibers and their composites: electrospinning, structure, performance, and applications". Frontiers in Materials. Volume 2 Article 62. doi: 10.3389/fmats.2015.00062. Published: Oct. 26, 2015.*

Zhang et al. "Synthesis and in vitro drug release behavior of amphiphilic triblock copolymer nanoparticles based on poly (ethylene glycol) and polycaprolactone". Biomaterials 26 (2005) 6736-6742. doi:10.1016/j.biomaterials.2005.03.045. Available online Jun. 1, 2005.*

* cited by examiner

*Primary Examiner* — Mike M Dollinger
(74) *Attorney, Agent, or Firm* — David L. Nocilly; George R. McGuire; Bond Schoeneck & King, PLLC

(57) ABSTRACT

Water-triggered shape memory polymers based on poly(ε-caprolactone) (PCL) and poly(ethylene glycol) (PEG) multiblock hybrid thermoplastic polyurethanes. Urethane linkages were formed through the addition reaction between isocyanate groups of the lysine methyl-ester diisocyanate (LDI) and the hydroxyl groups of either (PEG) or PCL diol.

17 Claims, 21 Drawing Sheets

WATER-TRIGGERED SHAPE MEMORY OF PCL-PEG MULTIBLOCK TPUS

CROSS-REFERENCE TO RELATED APPLICATIONS

The present application claims priority to U.S. Provisional Application No. 61/725,970, filed on Nov. 13, 2013

BACKGROUND OF THE INVENTION

1. Field of the Invention

The present invention relates to shape memory polymers and, more specifically, water responsive shape memory polymers.

2. Description of the Related Art

Shape memory polymers (SMPs) are a class of stimuli-responsive materials that can be elastically deformed and subsequently fixed into a temporary shape by network chain immobilization, and later recover to their original (permanent) shape when exposed to external stimuli that re-mobilize the network chains. Direct heating is the most widely studied external stimulus to induce shape recovery in the past years. Other stimuli such as light, electricity, magnetic field, and moisture have also been utilized as the recovery triggers.

Compared with heat-triggered SMPs, water responsive SMPs are capable of regaining their original shapes simply by immersing the samples in water. Here, undesirable effects resulting from external heating, such as damage of surrounding tissue and cells when activating a smart implant, can be avoided. In 2003, it was accidentally found that a pre-deformed and fixed film made of a commercially available polyurethane ($T_g$=35° C.) became rubber-like after one month of exposure in air at room temperature and recovered its original shape, with the $T_g$ decreasing to about 22° C. Later, moisture was identified as the stimulus causing the polymer to become rubber-like and thus triggering the shape recovery. This research also unveiled the recovery mechanism: water molecules, which diffuse into the polymer sample, disrupt the intramolecular hydrogen bonding and mobilize the previously vitrified network chains, thereby shift SMP transformation temperature (here, $T_g$) to lower temperatures and allow for room temperature actuation. The shape-memory effect associated with the lowering of transition temperatures has also been shown for polyurethanes composites with carbon nanotubes. In all cases, the shape memory effect was slow, with recovery taking at least 140 min.

A different strategy for water-induced shape-memory polymers has been realized by incorporating a hydrophilic or water swellable component into the structure. In this way, the shape recovery can be greatly accelerated. The water-activated SM effect has been demonstrated in poly(ethylene oxide) (PEO)-based polyurethanes with the hydrophobic polyhedral oligosilsesquioxane (POSS) moiety as the hard-segment. Exposure to water resulted in the water-swelling of the PEG segment and recovery of the permanent shape. The polymer films, obtained by solution casting, showed incomplete recovery (65-85%) after 300 seconds at 35° C. water. By modifying chitosan with PEG and epoxide crosslinking, a water-activated biodegradable stent has been prepared. The equilibrium shape was chemically fixed by crosslinking. The raw materials (chitosan and polyethylene glycol) used were relatively hydrophilic, and a subsequent immersion in water led to rapid hydration and recovery in a short period of 150 seconds. Shape memory polymers sensitive to organic solvents can also be obtained which are similar to the hydrophilic SMPs that are sensitive to water. It has been observed that dimethyl formamide (DMF) is capable of activating the shape memory response of a styrene-based SMP. Again, however, this effect was slow, with recovery taking at least 180 minutes. The slow response of existing water-triggering shape memory systems has thus indicated the need for new material design strategies that can tailor the recovery speed and recovery ratios for more controlled actuation.

BRIEF SUMMARY OF THE INVENTION

The present invention comprises a water-triggered shape memory polymer (SMP) family, PCL-PEG based thermoplastic polyurethanes (TPUs). Upon immersion in water, water molecules selectively swell the hydrophilic PEG domains, resulting in durable hydrogels with strain-to-failure values greater than 700 percent. Dry samples fixed in a temporary shape underwent water-triggered shape recovery wherein only the oriented PEG domains recovered, causing incomplete shape recovery toward the equilibrium shape upon contact with liquid water. The recovery speed of the present invention was studied by varying the thickness of bulk films and demonstrated that water-recovery is diffusion-limited. By processing the TPUs as a web of microfibers, rapid shape recovery was achieved in water at room temperature within 1.3 seconds.

Addressing the limited recovery observed for dry-fixing samples that led to some PCL domain deformation, the present invention includes a new "wet-fixing" SM cycle, where the temporary shape is achieved by deforming the material in the hydrogel state (wet drawing) and is later fixed via PEG recrystallization upon drying. The fixing and recovery ratios were substantially improved using this new shape memory method, the mechanism of which was proven by x-ray diffraction analysis. The controllable actuation speed, the high recoverable strain, and the simple fixing and recovery process make these materials potential candidates for applications as water responsive sensors, actuators, and medical devices.

In the present invention, instead of conventional "hard" blocks, entanglements serve as the physical crosslink in this system, which gives excellent elasticity above the melting transition. As such, the materials demonstrated excellent heat-triggered shape memory upon heating. The fixing and recovery abilities were evaluated by changing the TPUs composition and the programming protocols (dry drawing vs. wet drawing). Furthermore, the rate of water triggering was manipulated through variation of the diffusion distance in the form of bulk film thickness. Finally, the rate of water triggering can be greatly accelerated through a significant decrease in the diffusion distance, which was realized through the processing of selected SMPs in the form of nano- or micro-fibrous webs instead of bulk films.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 4:
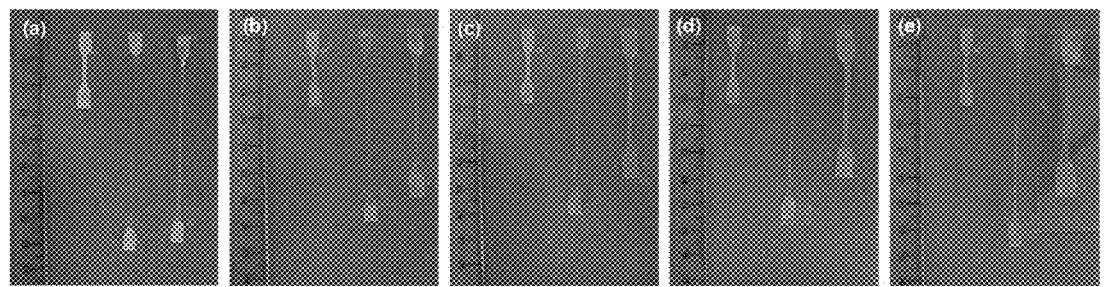

FIG. 4 is a series of photographs of water-triggered shape memory tests of PCL-PEG TPUs hot-pressed film: (a) [PCL]$_{70}$-[PEG]$_{30}$, (b) [PCL]$_{60}$-[PEG]$_{40}$, (c) [PCL]$_{50}$-[PEG]$_{50}$, (d) [PCL]$_{40}$-[PEG]$_{60}$, and (e) [PCL]$_{30}$-[PEG]$_{70}$. Samples on the left of each pictures: original dogbone films; samples shown in the middle: deformed films by Linkam; samples on the right: films after deformation and water recovery at room temperature for 10 min.

Figure 5:
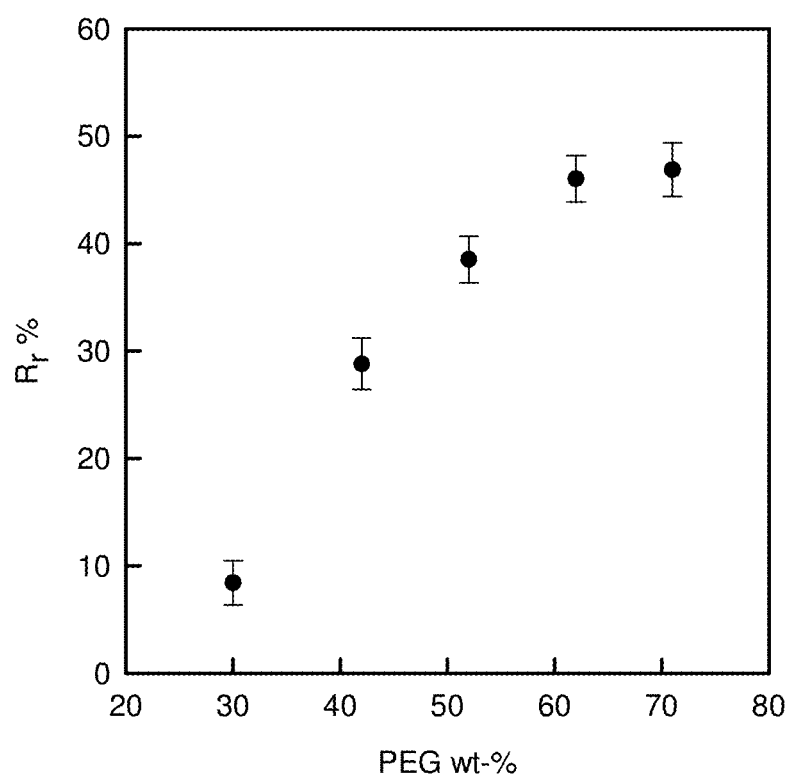

FIG. 5 is a graph of the dependence of shape recovery during water-triggered recovery, $R_r$ (%), on PEG wt-%.

Figure 6:
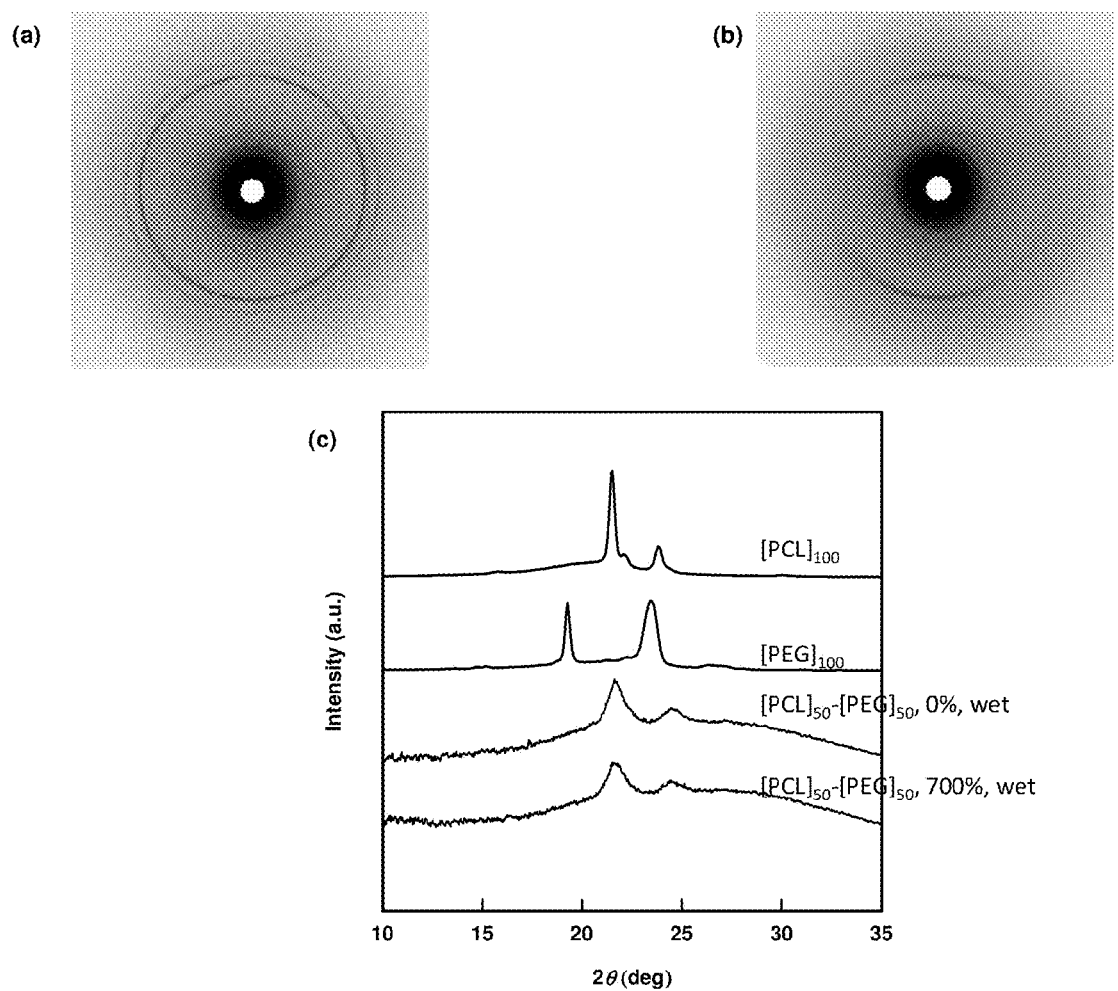

FIG. 6 is a) 2D WAXS patterns of [PCL]$_{50}$-[PEG]$_{50}$ after immersed in water at RT for 1 h; (b) 2D WAXS patterns of [PCL]$_{50}$-[PEG]$_{50}$ after deformation to 700% and immerse in water at RT for 1 h; and (c) a graph of the 1D WAXS profile of samples shown in (a) and (b). Data of [PCL]$_{100}$ and [PEG]$_{100}$ in dry state are shown here for comparison. For samples at swelling state, films were sandwiched between two layers of Kapton tapes and x-ray experiments were operated under no vacuum to prevent from water evaporating. The two-layer tapes were also tested and used as baseline and all reported WAXS curves for samples at "swelling state" have been subtracted by the pure two-layer tape. Samples at dry state were exposed under vacuum to eliminate air exposures.

Figure 7:
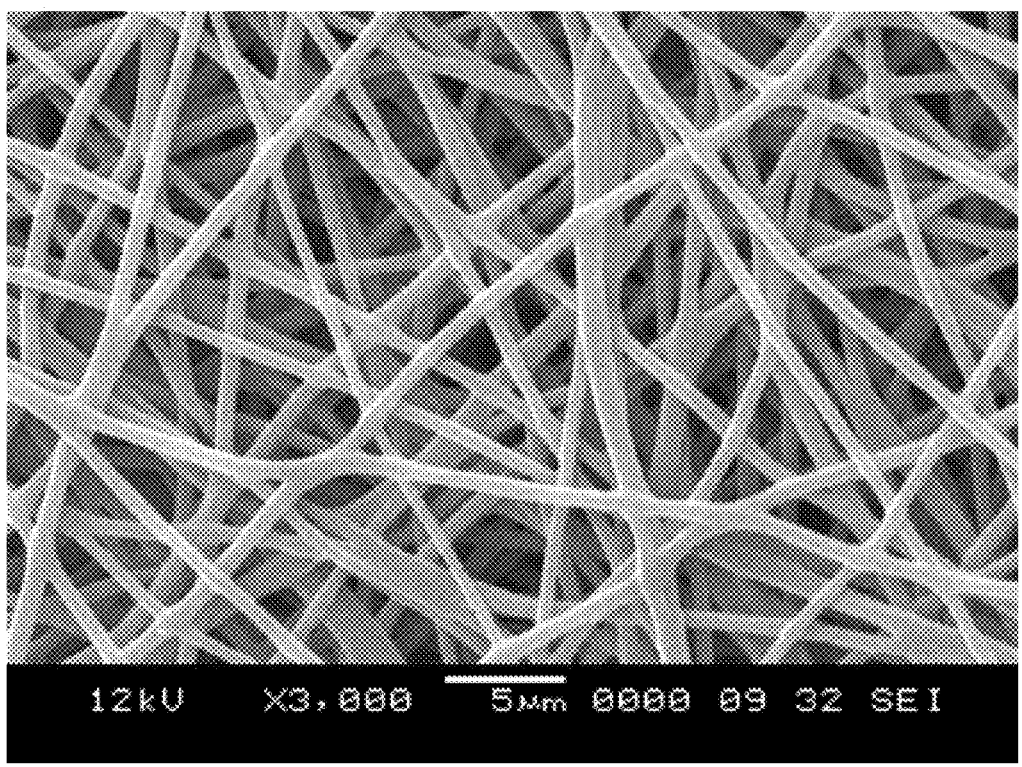

FIG. 7 is a scanning electron microscopy (SEM) image of fibrous mats made by electrospinning. The number-average fiber diameter was 810±28 nm.

Figure 8:
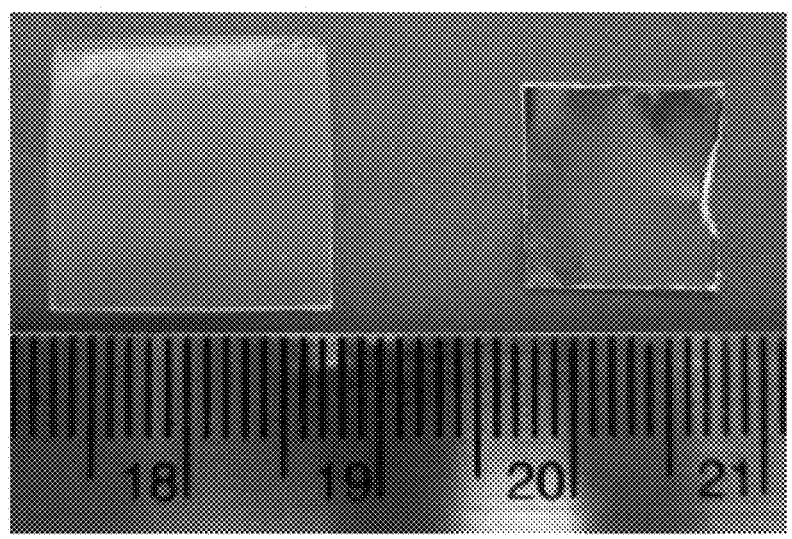
Figure 8:
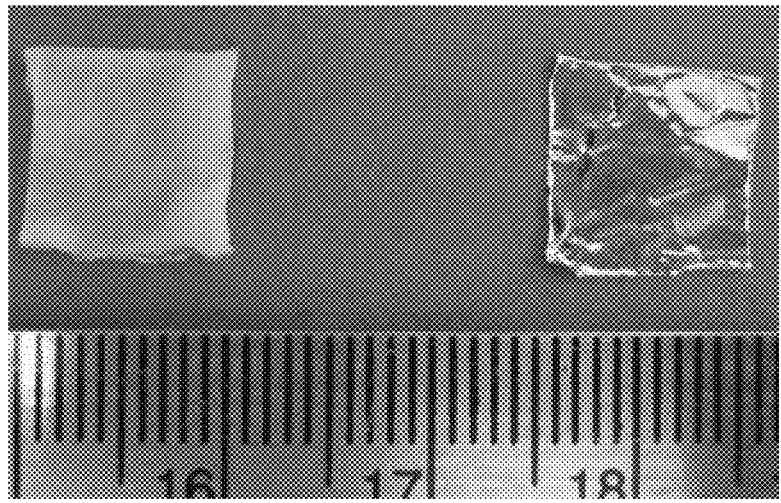

FIG. 8 is a series of digital images of (a) hot-pressed films (hpf) and (b) e-spun webs in the water swollen state. The aluminum foils shown on the right of each image represent the dimensions of samples in the dry state. Samples were immersed in water at room temperature for 10 min.

Figure 9:
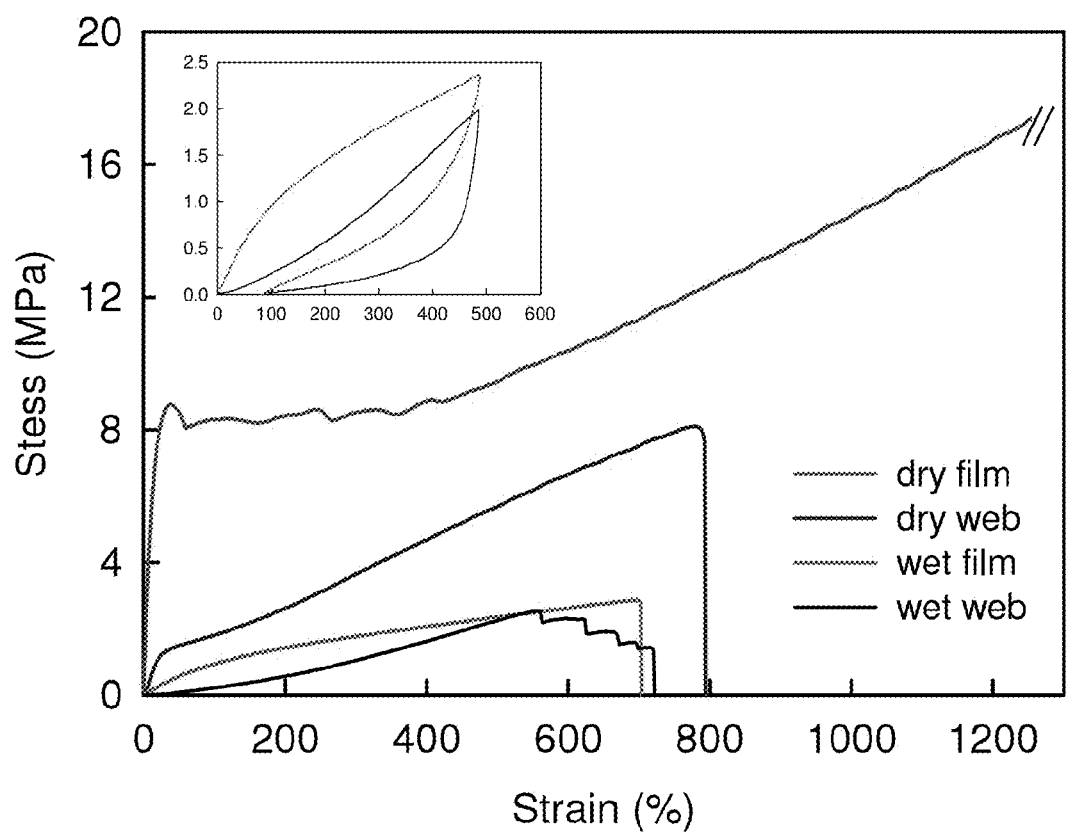

FIG. 9 is a graph of the stress-strain response of hot-press films and e-spun webs which were stretched in the dry state and wet state, respectively. All samples were deformed at 192%/min at room temperature. The inset shows hysteresis of two hydrogels (wet film and wet web) upon removal of the load at 192%/min.

Figure 10:
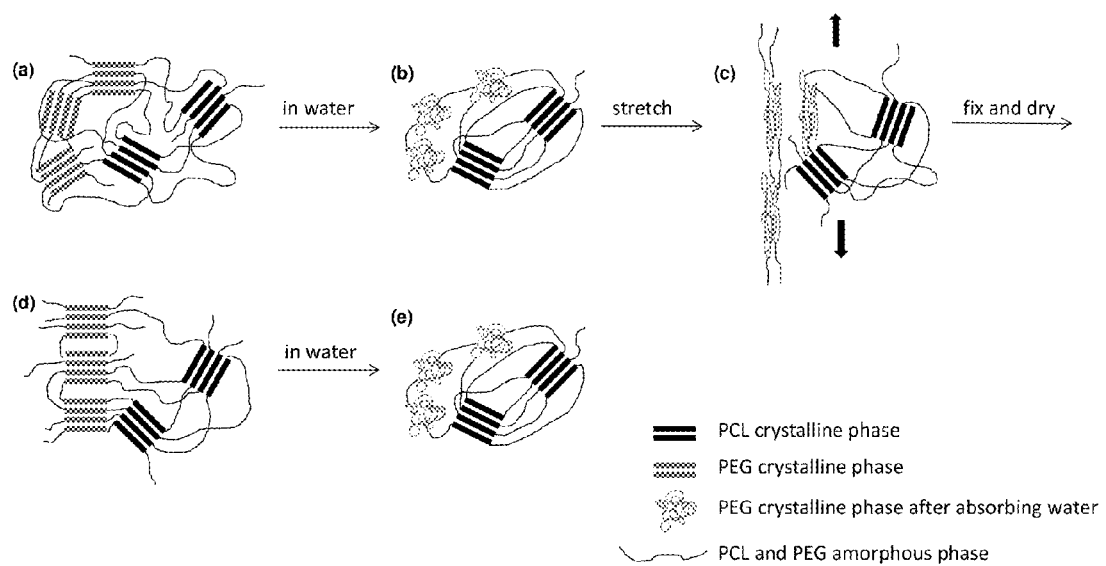

FIG. 10 is a schematic of the microstructure change on PCL-PEG TPUs during hydrogel shape memory process.

Figure 11:
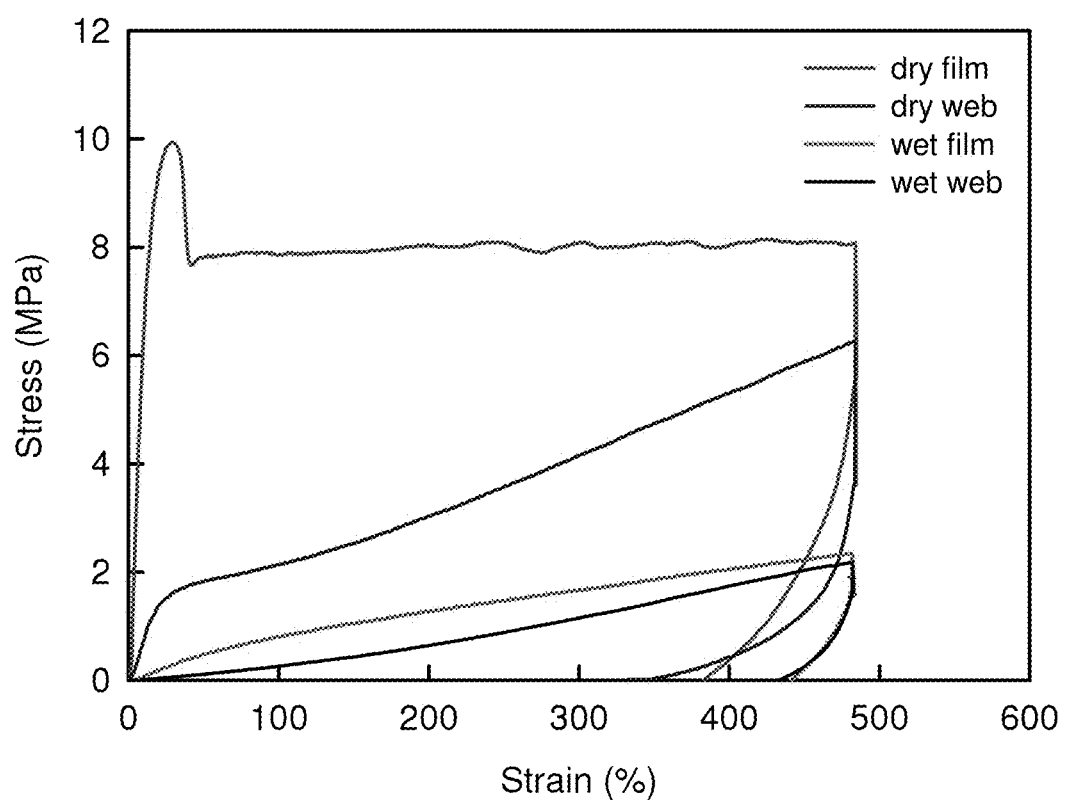

FIG. 11 is a graph of a stress-strain curve showing the sample programming method for water-triggered shape memory experiments of hot-press film and e-spun webs in dry state and wet state. All samples were deformed to 485% at 192%/min, and fixed (dried) by holding constant strains for 3 h at room temperature. Following the fixing step, all samples were unloaded at 192%/min until the force dropped to zero.

Figure 12:
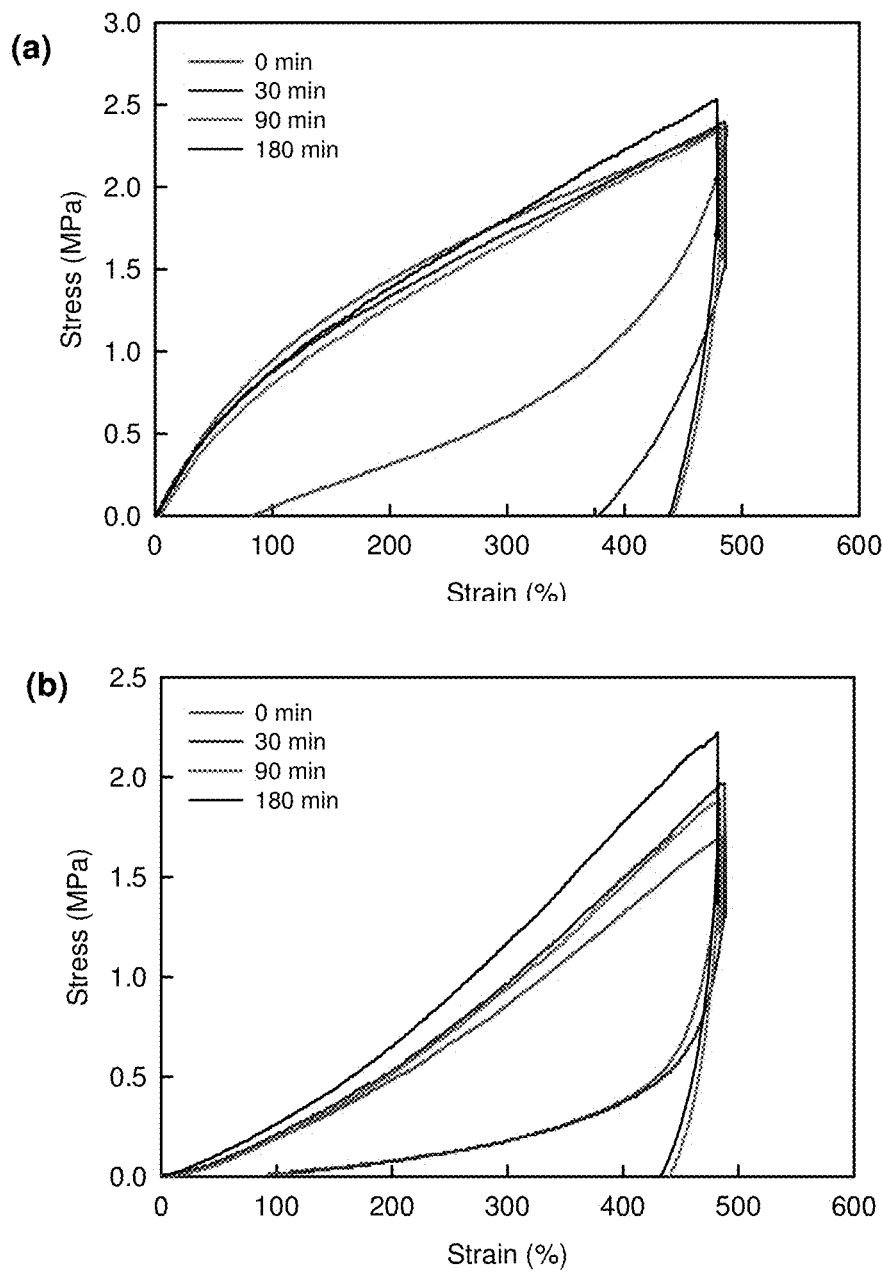

FIG. 12 is a series of graphs of the stress-strain response of (a) films and (b) webs which were deformed in wet state at 192%/min and fixed (dried) for different time durations at room temperature. Following the fixing step, all samples were unloaded at 192%/min until the force dropped to zero.

Figure 13:
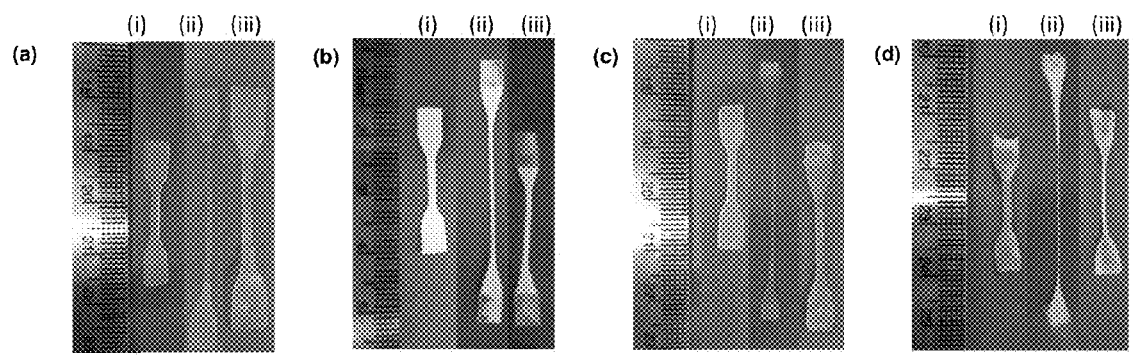

FIG. 13 is a series of graphs of water-triggered shape memory tests of (a) dry film, (b) dry web, (c) wet film, and (d) wet web. (i) original dogbone samples; (ii) stretched and fixed samples by Linkam (S/F); and (iii) samples after stretching, fixing and water recovery at room temperature (S/F/R).

Figure 14:
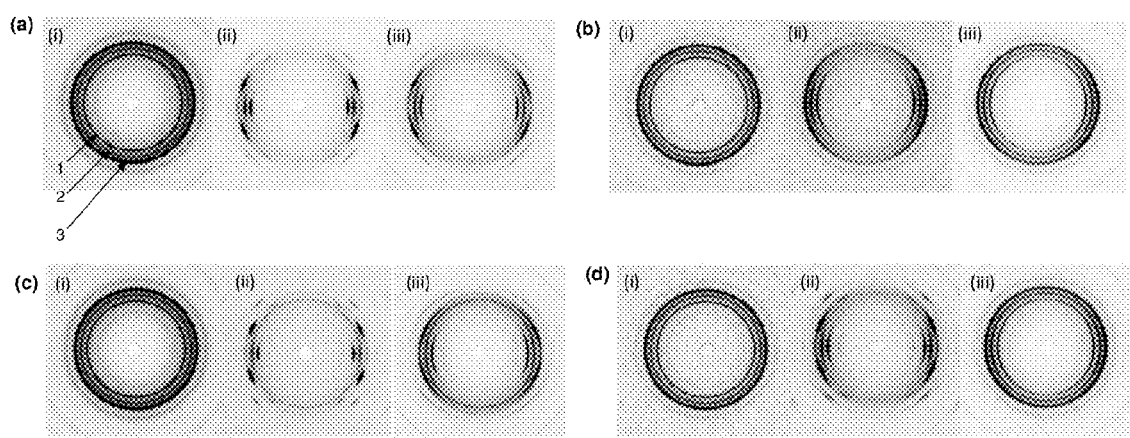

FIG. 14 is a series of 2D WAXS patterns of (a) dry films, (b) dry webs, (c) wet films, and (d) wet webs. (i) original dogbone samples; (ii) stretched and fixed samples by Linkam (S/F); and (iii) samples which were stretched, fixed, water recovered and dried (S/F/R/D). Strain axis is vertical.

Figure 15:
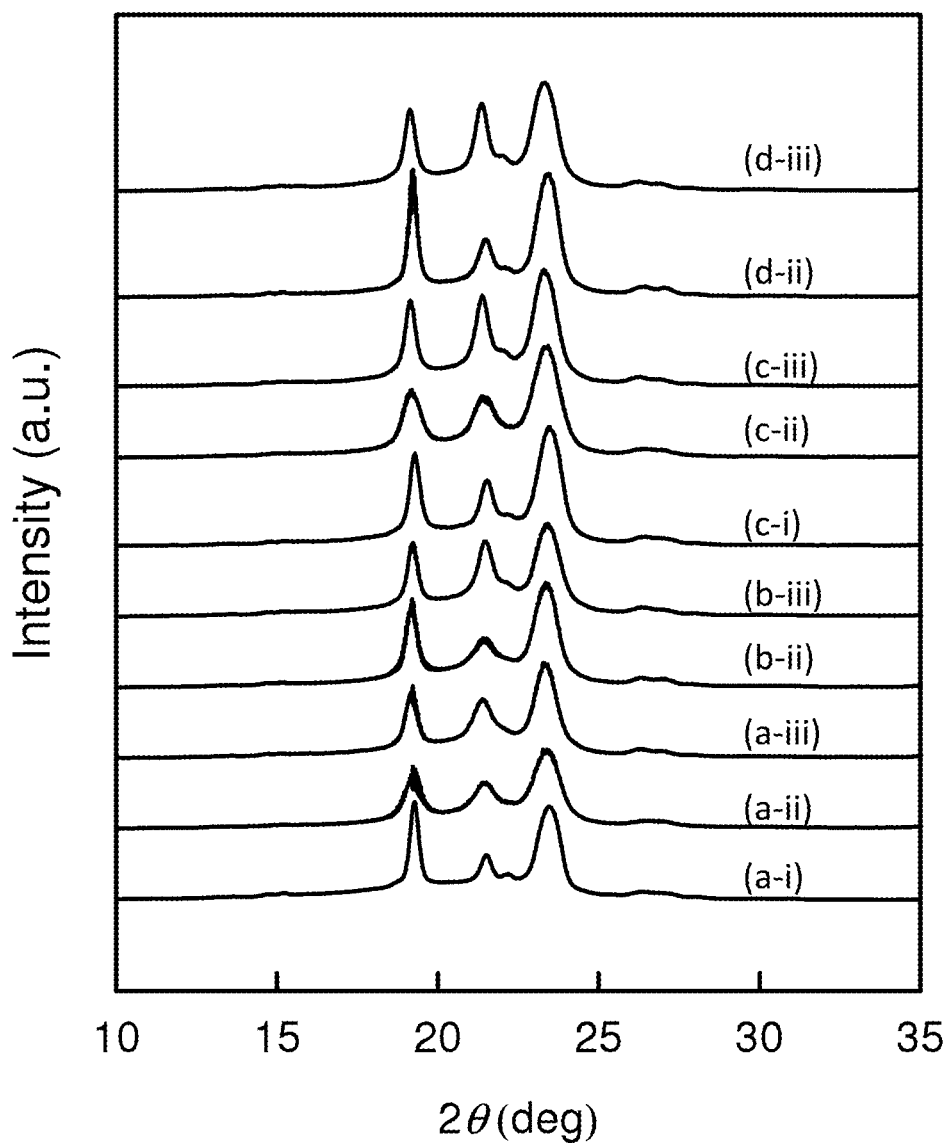

FIG. 15 is a graph of the 1D WAXS profiles of (a) dry films, (b) wet films, (c) dry webs, and (d) wet webs. (i) original samples; (ii) samples which were deformed and fixed by Linkam (S/F); and (iii) samples which were deformed, fixed, water recovered and dried (S/F/R/D)

Figure 16:
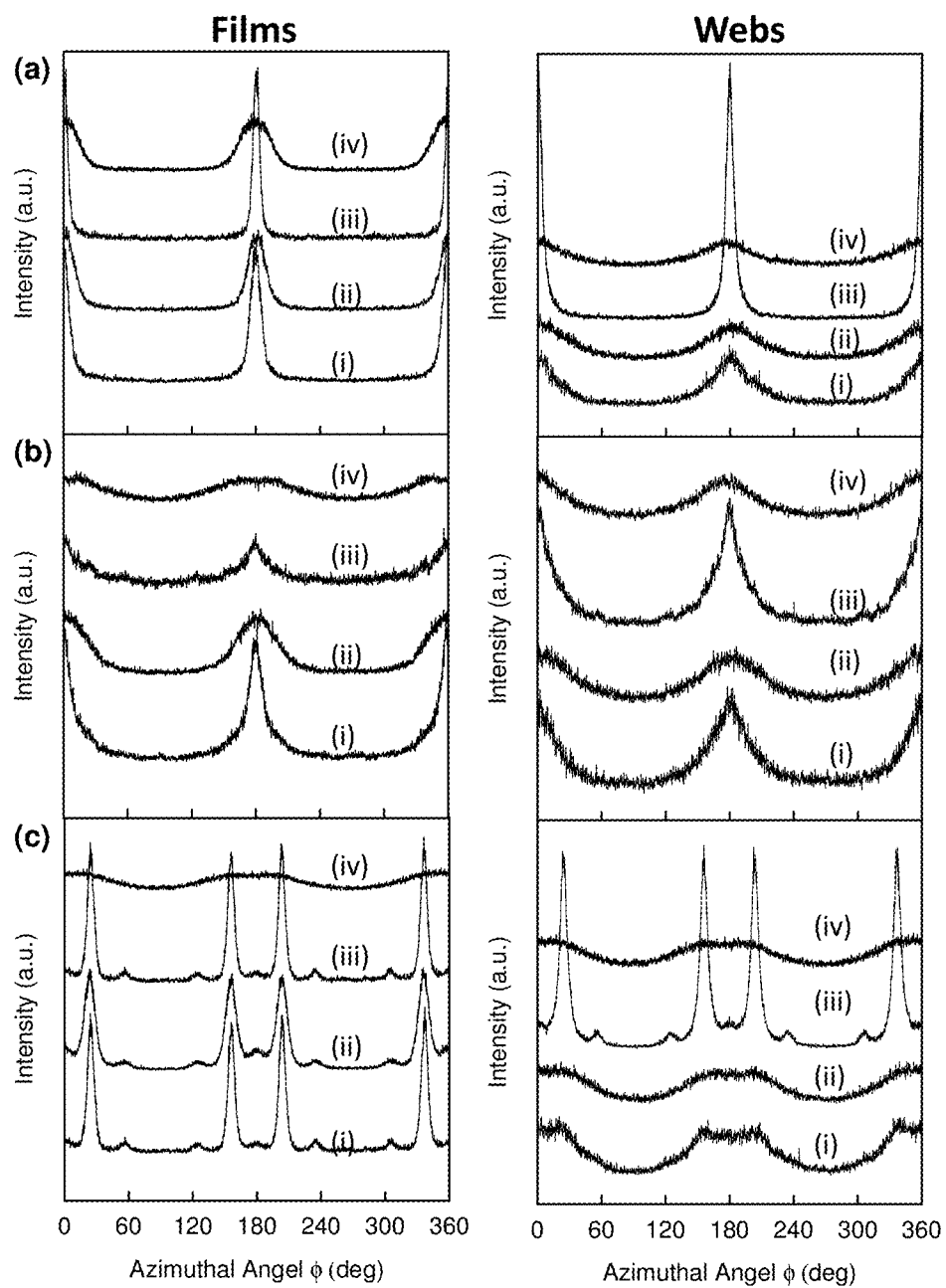

FIG. 16 is a series of graphs showing the intensity versus azimuth of (a) Peak 1: (120) reflection of PEG phase, (b) Peak 2: (110) reflection of PCL phase and (c) Peak 3: (200) reflection of PCL phase, and diverse planes of PEG phase of hot-pressed films and epsun webs. (i) dry film/web_S/F; (ii) dry film/web_S/F/R/D, (iii) wet film/web_S/F, and (iv) wet film/web_S/F/R/D. The corresponding 2D WAXS image is shown in FIG. 14.

Figure 17:
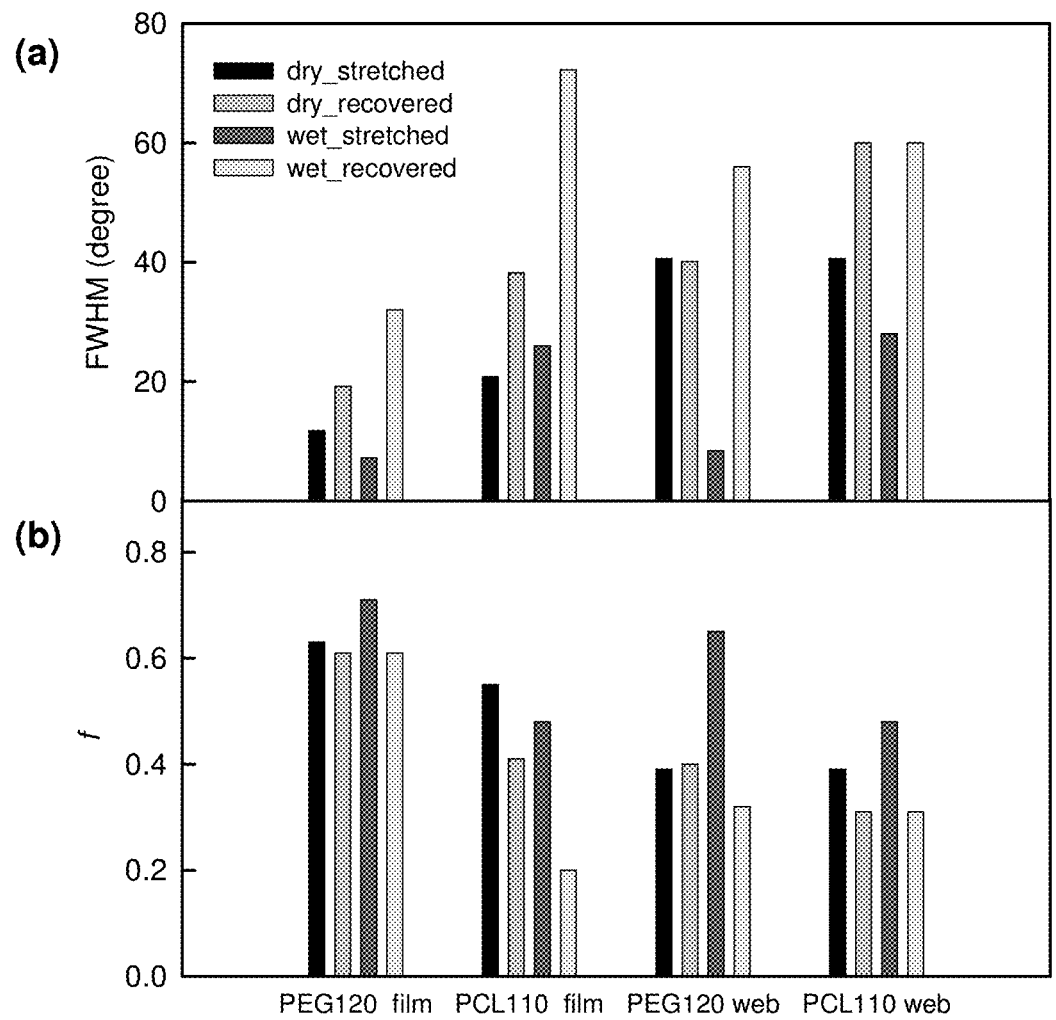

FIG. 17 is a series of bar charts showing (a) Full-width at half maximum (FWHM) and (b) Herman's orientation function ($f$) of PEG(120), and PCL(110) reflection of hot-press films and e-spun webs which were deformed in dry state and wet state, respectively. The azimuthal scan data was fit using Curve Resolution Program for Windows software (Asai Company, Japan) and the values of FWHM for were obtained from the software. Herman's orientation function, $f$, is defined as: $f=(3\langle\cos^2\phi\rangle_{hkl}-1)/2$. The average orientation, expressed as $\langle\cos^2\Phi_{hkl}\rangle$, was calculated by numerical integration using the following equation: $\langle\cos^2\phi_{hkl}\rangle = (\int_0^{\pi/2}I(\phi)\cdot\cos^2\phi\cdot\sin\phi\cdot d\phi)/(\int_0^{\pi/2}I(\phi)\cdot\sin\phi\cdot d\phi)$, where $\phi$ is the azimuthal angle and $I(\phi)$ is the scattered intensity along the angle $\phi$. It is noted that Peak 3 was not used to determine degree of crystal orientation since it is an overlap of several reflections described above.

Figure 18:
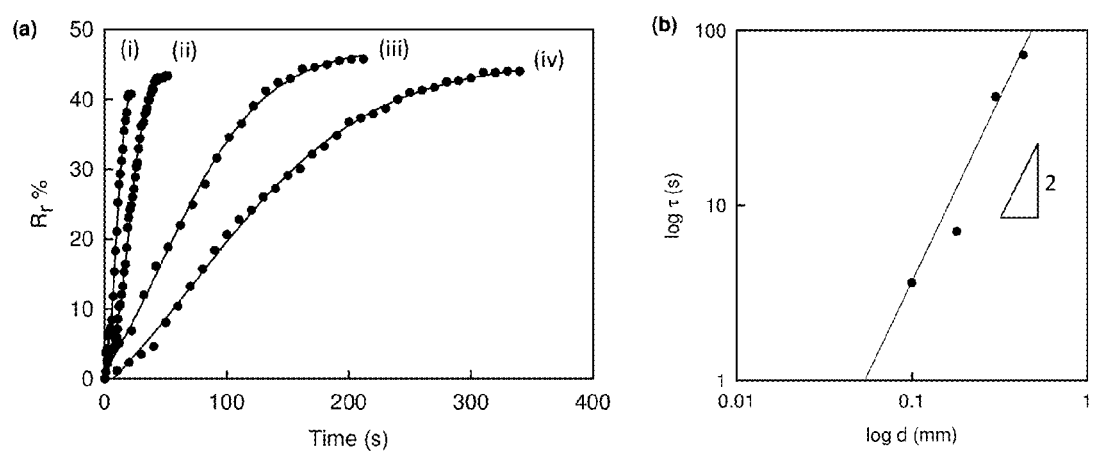

FIG. 18 is a series of graphs of water-triggered shape recovery of pre-deformed hpf in water: (a) recovery profiles of hpf with four different thickness of (i) 100 μm, (ii) 180 μm, (iii) 300 μm and (iv) 430 μm. The solid lines are fit curves using a four-parameter sigmoidal function. (b) plot of log τ vs. log d for the hpf with four thicknesses. The solid line is fit by linear regression with slope of 2.

Figure 19:
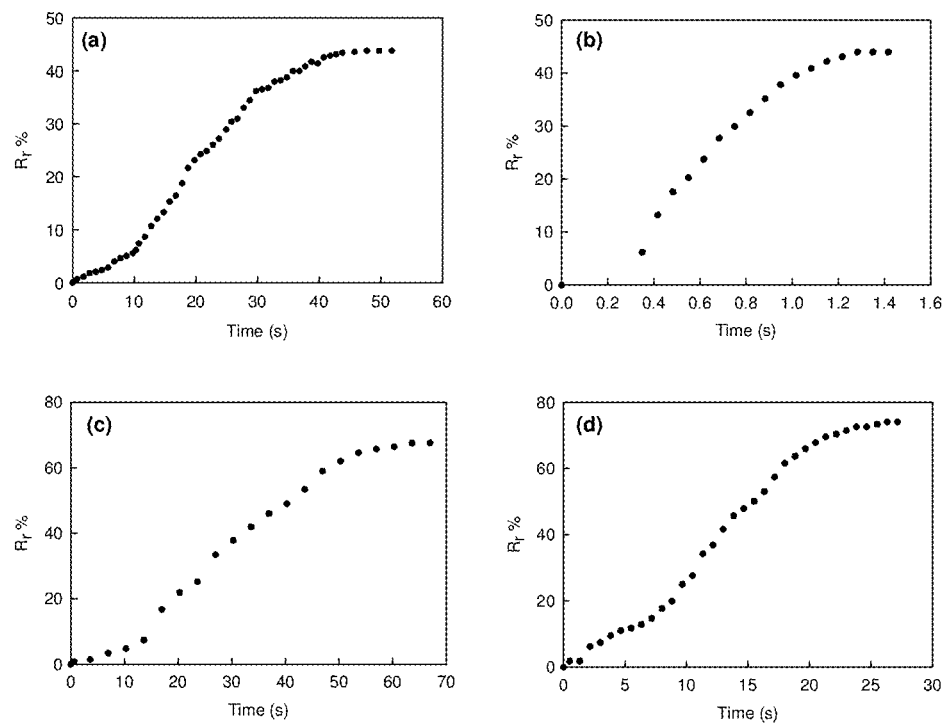

FIG. 19 is a series of water-triggered recovery profiles e-spun webs and hpf: (a) dry film, (b) dry web, (c) wet film and (d) wet web. All four samples were stretched to 485%, and fixed for 3 hours at room temperature. For all samples, time "0" is when the lower end of the sample first touching water. For (b), the $2^{nd}$ data point was collected when the whole sample were immersed in water.

Figure 20:
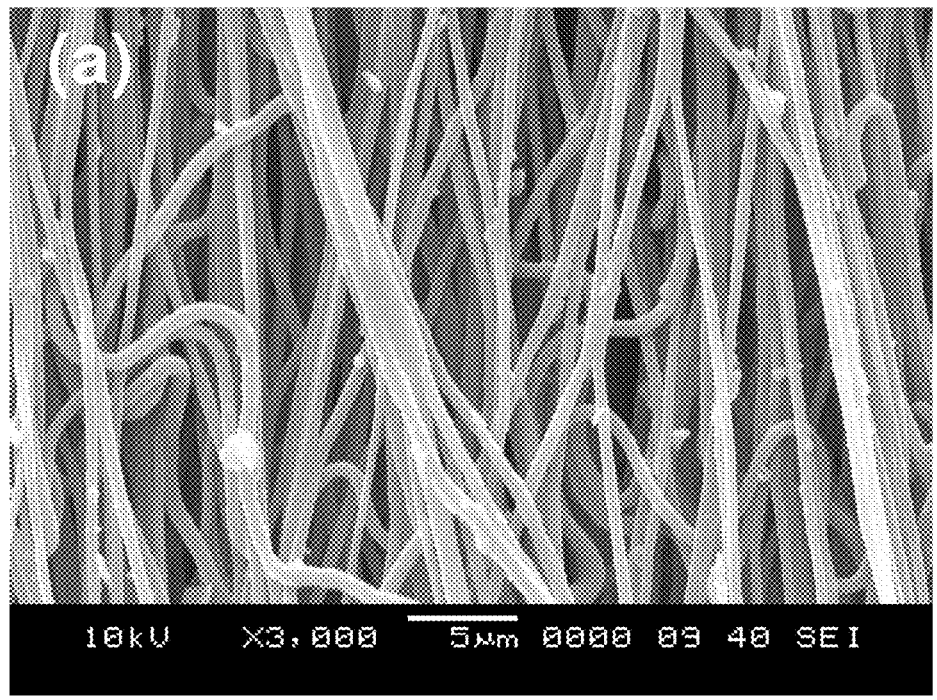
Figure 20:
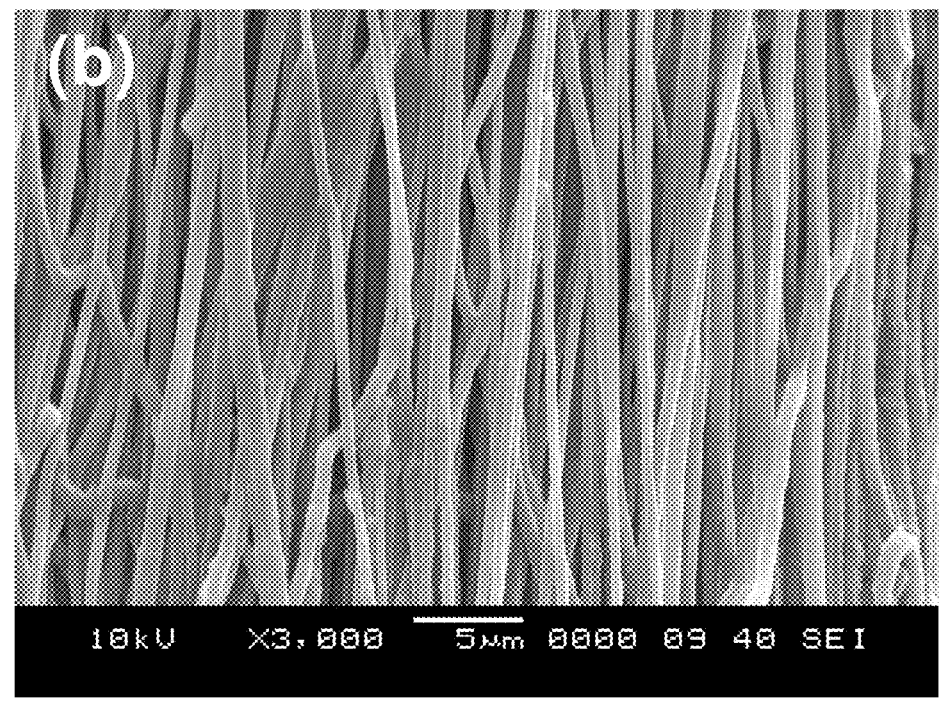

FIG. 20 is a series of scanning electron microscopy (SEM) images of fibrous mats (a) dry mat after stretching and fixing for 3 h, and (b) wet mat after stretching and fixing (drying) for 3 h. Strain axis is vertical.

Figure 21:
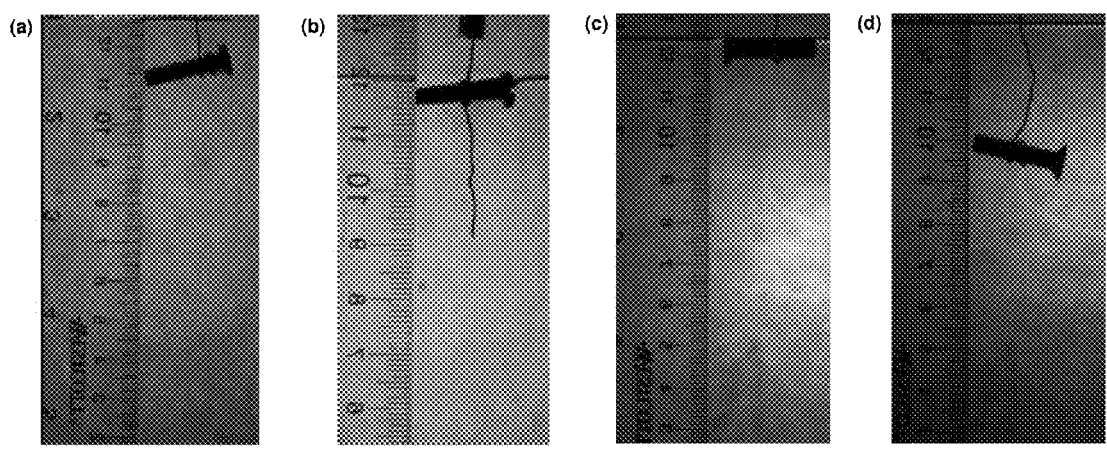

FIG. 21 is a series of movie clips showing water-triggered recovery of pre-deformed e-spun web and hot-press film at RT. (a) film_dry stretch with sampling rate 60 fps and play rate 240 fps, (b) web_dry stretch with sampling rate 250 fps and play rate 250 fps, (c) film_wet stretch with sampling rate 60 fps and play rate 480 fps, and (d) web_wet stretch with sampling rate 60 fps and play rate 240 fps.

DETAILED DESCRIPTION OF THE INVENTION

Figure 1:
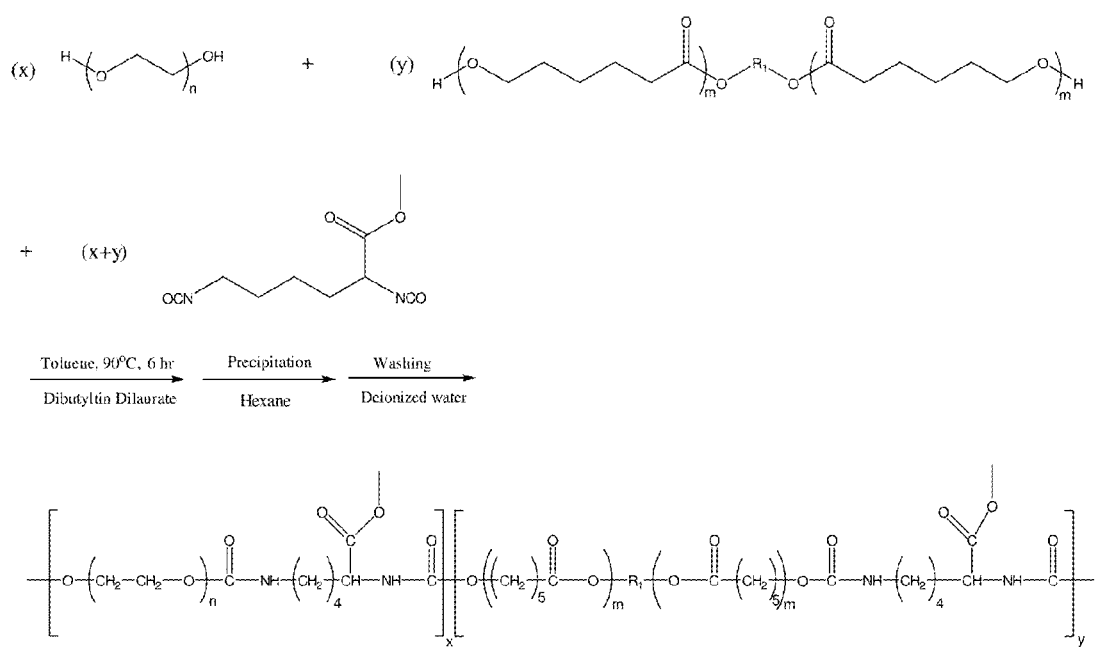
FIG. 1 is a schematic of the preparation of PCL-PEG multi-block TPUs by reacting the PEG diol and PCL diol with a lysine-derived diisocyanate.

Referring now to the drawings, wherein like reference numerals refer to like parts throughout, there is seen in FIG. 1 a schematic of the synthesis of high molecular weight PCL-PEG multiblock hybrid thermoplastic polyurethanes. The urethane linkages were formed through the addition reaction between isocyanate groups of the lysine methyl-ester diisocyanate (LDI) and the hydroxyl groups of either poly(ethylene glycol) (PEG) or poly(ϵ-caprolactone) (PCL) diol. Seven PCL-PEG TPUs of varying compositions were synthesized. The feed ratios of PCL/PEG were varied to control the hydrophilic-hydrophobic balance. Crystalline phases of both blocks coexisted in the multi-block TPUs, indicating microphase separation driven by thermodynamic incompatibility between hydrophilic PEG blocks and hydrophobic PCL blocks and dramatic contrast in hydrophilicity between the two blocks.

The study of the water-triggered shape memory behavior of PCL-PEG TPUs involves their contact with water. As such, their water-swelling behaviors are of primary importance. Here, water was expected to selectively permeate into the hydrophilic PEG blocks, resulting in weight gain of the bulk materials. The hydrophobic PCL-rich domains and the entanglements serving as physical crosslinks prevented the material from dissolution, limiting swelling. For the two homopolymers, $[PCL]_{100}$ exhibited almost no water uptake, while $[PEG]_{100}$ dissolved in water upon immersion. In contrast, the copolymers swelled in water, evidenced by mass gain and volumetric expansion. Molecular weights other than 10 k for each block (PCL and PEG) are anticipated to behave in a similar manner, as long as the value is sufficiently large to enable melting a melting temperature for each that is greater than room temperature. Thus, it is anticipated that molecular weights for the polyols (PCL and PEG) ranging from 2 kDa to as large as 100 kDa, each, will function in a similar manner.

Figure 2:
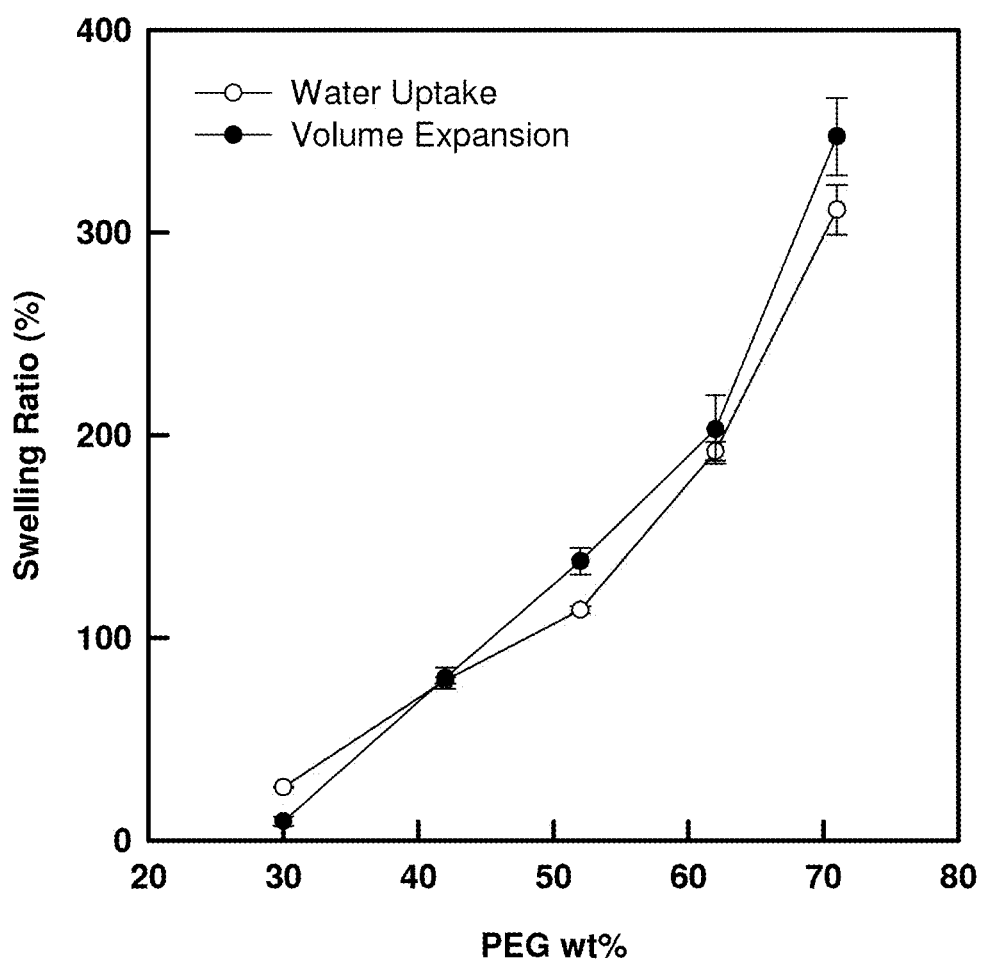
FIG. 2 is a graph of the water uptake and volume expansion of PCL-PEG TPUs hot-press films. Films were immersed in water at room temperature for 1 hour.
Figure 3:
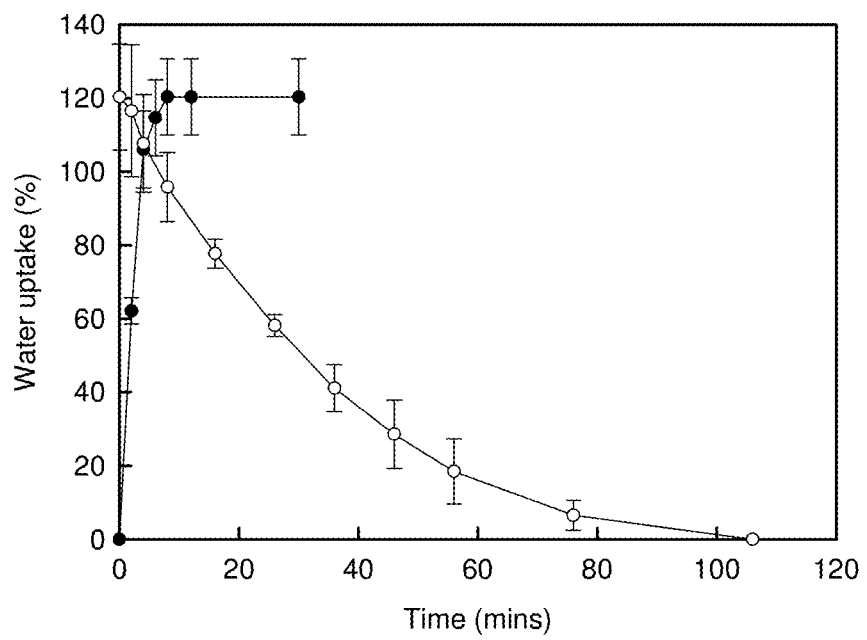
FIG. 3 is a graph of swelling (closed circle) and deswelling kinetics (open circle) of $[PCL]_{50}$-$[PEG]_{50}$ in water at room temperature. The dimension of the film is 10 mm×10 mm×0.35 mm (thickness). [PCL]$_{40}$-[PEG]$_{60}$, (vi) [PCL]$_{30}$-[PEG]$_{70}$ and (vii) [PEG]$_{100}$.

It was found that the weight gain of the five copolymers increased from 26% ($[PCL]_{70}$-$[PEG]_{30}$) up to 311% ($[PCL]_{30}$-$[PEG]_{70}$) with increasing PEG content, as shown in FIG. 2. The weight gain was quite close to volume expansion, as expected due to the density of our TPUs being similar to water. All of the hydrogels were translucent in appearance, a finding we attribute to the microphase-separated structure and high crystallinity of the water-impervious PCL blocks. The swelling and deswelling kinetics at room temperature for one representative composition, $[PCL]_{50}$-$[PEG]_{50}$, are provided in FIG. 3. After 2 min in water, more than 60% water had permeated into the sample. Equilibration was reached within 8 min and settled at a value of 120%. Upon drying in open atmosphere, the absorbed water gradually evaporated and the sample was completely dried within 2 hours.

The fixed strains of stretched films were expected to partially recover upon immersion in water, considering water only dissolves the hydrophilic PEG domains. Thus, copolymers films were stretched to 1240% at RT using the Linkam tensile tester and the strains were then released until the stresses dropped to 0 MPa, to observe the initial elastic shape recovery. This yielded fixed deformations between permanent and temporary shape to be ~800%. Upon tensile deformation, the constituent chains and domains of both PCL and PEG phases became highly oriented. All compositions completed their water-triggered recovery within 10 min, with the extent of recovery increasing from 8% to 47% as the PEG content increased from 30 to 70 wt-%, as seen in FIG. 4 and Table 1. The asymptotic dependence of recovery on PEG wt-%, as seen in FIG. 5, is explained by the higher swelling ratios at higher PEG content. The swelling trend was clearly reflected by tab parts of the dogbone samples after water recovery, as seen in FIG. 4. Only PCL crystal reflections existed in the wet state and they remained oriented after water-triggered recovery based on the WAXS results, as seen in FIG. 6. This indicates, interestingly, that the deformed PCL phase is the root cause of incomplete recovery of copolymers in water, and suggests the solution introduced later in this manuscript: wet drawing. In addition, the PCL peaks became broader in the wet state, implying the decrease of crystallite size after immersing in water.

TABLE 1

Summary of fixing ratios ($R_f$%) and recovery ratios ($R_r$%) of PCL-PEG TPUs, which were deformed by Linkam and recovered in water at RT for 10 min.

| Material | $R_f$(%) | $R_r$(%) |
|---|---|---|
| $[PCL]_{70}$-$[PEG]_{30}$ | 72 ± 3 | 8 ± 2 |
| $[PCL]_{60}$-$[PEG]_{40}$ | 58 ± 3 | 29 ± 2 |
| $[PCL]_{50}$-$[PEG]_{50}$ | 59 ± 3 | 39 ± 2 |
| $[PCL]_{40}$-$[PEG]_{60}$ | 60 ± 6 | 46 ± 2 |
| $[PCL]_{30}$-$[PEG]_{70}$ | 71 ± 4 | 47 ± 3 |

Some of the key limitations of the current PCL-PEG TPUs system include: (1) low recovery ratio (<50%), primarily due to unrecovered PCL phase in water; (2) Low recovery speed. Although the recovery speed is already quite high among the current water-triggered SMPs in literature, it's still not comparable to that of heat-induced SMPs or electrically-triggered SMPs, the recovery of which completes in a couple of seconds. The limitations of current PCL-PEG TPUs indicated the need for new material and process design strategies that could improve the recovery ratios and enhance the recovery speed. $[PCL]_{40}$-$[PEG]_{60}$ was picked as the material for all the following study given its relatively good water recovery property.

Given the time scale for mass diffusion follows:

$$\tau \approx d^2/D$$

where d is the diffusional distance and D is the mass diffusivity, one hypothesis is that the rate of water triggering can be sped up through a significant decrease in the diffusion distance. This could be accomplished through the processing of $[PCL]_{40}$-$[PEG]_{60}$ in the form of nano- or micro-fibers. The fibrous mats were achieved by electrospinning with an average thickness of 0.38 mm, which is comparable to the thickness of the bulk films (0.35 mm), but with much smaller internal structure of the constituent fibers. Electrostatic forces are utilized to uniaxially stretch a viscoelastic jet derived from a polymer solution or melt into fibers with small diameters. The resulting electrospun fibrous mats made from the PCL-PEG TPUs had the appearance of a white, nonwoven fabric. The fiber morphology was further characterized by SEM, and a representative micrograph is shown in FIG. 7. Using ImageJ software, an average fiber diameter of 810±28 nm was obtained from 90 measurements.

FIG. 8(*a*) shows the volume expansion of a hot-press film after reaching the equilibrium state. In contrast, the electrospun fibrous mats did not expand upon exposure to water, as shown in FIG. 8(*b*). The relaxation of molecular orientation upon hydration likely suppressed swelling characteristics in the radial direction. Owing to the internal void space in the porous structure, the water uptake of the webs (840%) was much higher than that of the films (192%), see Table 2. Similar swelling behavior has been reported on the POSS-PEG TPUs system.

TABLE 2

Water uptake, surface expansion and thickness expansion of e-spun webs and hot-press films. Samples were immersed in water at room temperature for 10 min.

| Samples | Water uptake (%) | Surface expansion (%) | Thickness expansion (%) |
|---|---|---|---|
| Webs | 840 ± 8 | −2 ± 1 | 64 ± 13 |
| Films | 192 ± 5 | 146 ± 10 | 23 ± 2 |

Mechanically robust samples were desirable for shape memory applications, so the ultimate tensile properties of films and webs were probed, both in the dry and hydrogel states. For "wet film" and "wet web" specimens, samples were swelled in water to equilibrium first, and then cut into the dogbone geometry. Representative stress-strain curves are provided in FIG. 9, with tensile properties, such as Young's modulus, ultimate tensile stress, and strain-at-break tabulated in Table 3.

TABLE 3

Mechanical properties of e-spun webs and hot-press film in the dry state and in the hydrogel (wet) state.

| Samples | Young's modulus (MPa) | Ultimate stress (MPa) | Strain at break (%) |
| --- | --- | --- | --- |
| Dry films | 56.8 ± 2.5 | >16 | >1240 |
| Dry webs | 5.4 ± 1.4 | 7.0 ± 0.5 | 820 ± 37 |
| Wet films | 1.1 ± 0.2 | 2.8 ± 0.1 | 735 ± 39 |
| Wet webs | 0.2 ± 0.0 | 2.4 ± 0.2 | 742 ± 21 |

The stress-strain curve of "dry film" sample is shown as the red curve, with Young's modulus of 56.8 MPa, a yield stress of 9.2 MPa, and a strain-to-failure larger than 1240% (the limit of our apparatus). After immersing the film in water to form a hydrogel (i.e. "wet film"), the sample became much softer and gave an elastomeric response with the disappearance of the yield point (pink curve). Its Young's modulus decreased to 1.1 MPa and the strain-to-failure decreased to 735%. When a strain is applied to the dry electrospun mat (blue curve), fibers that happen to be oriented near the strain direction are stretched uniaxially, while most fibers oriented at some angle relative to the stretching direction experience a rotation, resulting in the disappearance of the necking phenomenon. The orientation of fibers during the initial deformation stage and the lower density of the espun webs lead to the much lower Young's modulus in the electrospun material (the electrospun PU has a density of approximately one-sixth that of the bulk film). The wet e-spun web is the softest among all four samples, with a Young's modulus of 0.2 MPa and an elongation-at-break of 742% (black curve). The failure strain of the present hydrogel system is quite high among natural and synthetic hydrogels reported in the literature, as seen in Table 4. The high elongation-at-break would potentially allow large recoverable deformation between the temporary shape and the permanent shape.

TABLE 4

Comparison of mechanical properties of synthetic and natural hydrogels reported in the literature. For the ultimate stress and strain-at-break, the highest one was reported here if there are a series of values shown in the reference.

| References | Hydrogel | Young's modulus (MPa) | Ultimate stress (MPa) | Strain at break (%) |
| --- | --- | --- | --- | --- |
| Wan et al., *J Biomed Mater Res*, 2002, 63:854 | PVA hydrogels | 0.2 | 1.0 | 80 |
| Temenoff et al., *J Biomed Mater Res*, 2002, 59:429 | Oligo (PEG fumarate) + PEG-DA | 0.02~0.08 | 0.02 | 80 |
| Burdick et al., *Biomacromolecules*, 2005, 6:386 | Hyaluronic acid | 0.02~0.1 | 0.15 | 50 |
| Normand et al., *Biomacromolecules*, 2000, 1:730 | Agarose gel | 0.08~3.7 | 0.6 | 45 |
| Roeder et al., *J Biomech Eng*, 2002, 124:214 | Collagen | 0.02 | 0.008 | 60 |
| Drury et al., *Biomaterials*, 2004, 25, 3187 | Alginate hydrogels | 0.05 | 0.03 | 100 |
| Present invention | PCL-PEG based hydrogel | 0.2~1.1 | 2.8 | 742 |

As shown as an inset in FIG. 9, the two hydrogel samples showed elastomeric behavior, with ~80% strain recovered by releasing the force, though with large hysteresis we attribute to plastic deformation of the hydrophobic PCL phase at room temperature.

The present invention includes a new, yet simple, shape memory cycle referred to as "hydrogel shape memory," as shown schematically in FIG. 10 and explained below. In the PCL-PEG TPUs, both PCL and PEG phases crystallize at room temperature, as seen in FIG. 9(a). Upon immersion in water, the hydrophilic PEG segments absorb water, and become significantly more compliant than the hydrophobic PCL blocks, as seen in FIG. 10(b); therefore during wet-drawing, the PEG phase deforms before the PCL phase, the latter undergoes very limited or no deformation, as seen FIG. 10(c). The temporary, deformed shape is fixed by PEG recrystallization during drying, as seen in FIG. 10(d). Upon contact with water, the deformed PEG phase recovers, giving rise to near-complete shape recovery, as seen in FIG. 6(e). In contrast, for a conventional SM cycle, the fixing is accomplished via cooling below the transition temperature by vitrification or crystallization after deformation above $T_g$ or $T_m$. This "hydrogel shape memory" hypothesis is proven by comparing the water-triggered recovery behaviors of pre-deformed dry samples and wet samples (hydrogels), as discussed below.

All samples for water-triggered shape memory study were deformed using the Linkam tensile tester at room temperature. The wet film and wet web were stretched to 485% and fixed at this strain by holding for 3 h at room temperature to allow the wet samples to dry and the PEG phase to recrystallize. For comparison, the dry film and dry web were stretched and held at this strain (485%) for 3 h to allow for stress relaxation to occur. The strain was then released until the stress dropped to zero, as seen in FIG. 11. Fixing ratios ($R_f$) for all samples were calculated based on the stress-strain curves and summarized in Table 3. Through fixing via PEG recrystallization, both hydrogel samples exhibited higher $R_f$ (89% and 91% for wet film and wet web, respectively) than the dry samples (77% and 70% for dry film and dry web, respectively). The fixing ability of the wet samples was further studied by varying the fixing (drying) time, and it was observed that 1.5 h was long enough to achieve as high $R_f$ as 3 h, as seen in FIG. 12. These highly deformed samples were then immersed in water at room temperature for 10 min to trigger shape recovery.

FIG. 13 shows the picture of original dogbone samples, stretched and fixed samples (abbreviated as "S/F"), and samples after stretching, fixing and water recovery (abbreviated as "S/F/R"). The corresponding recovery ratios ($R_r$) are reported in Table 5. Partial recovery was achieved for the dry film with $R_r$=44%. The recovery ratio of the dry web significantly increased to 64% compared with the dry film. The larger surface expansion of the bulk film in water accounts for its lower recovery ratio. By programming the samples in the hydrogel state, their recovery ratios greatly improved to 73%

(film) and 83% (web). We postulate that for the wet samples, the PCL phase did not deform (or experienced limited deformation) upon tensile deformation and thus resulted better recovery. This postulation was confirmed by an x-ray study, as revealed below.

TABLE 5

Summary of fixing ratios ($R_f$ %) and recovery ratios ($R_r$ %) of e-spun webs and hot-press films, which were deformed by Linkam, fixed for 3 h, and recovered in water at RT.

| Samples | $R_f$ (%) | $R_r$ (%) |
|---|---|---|
| Dry films | 77 ± 2 | 44 ± 3 |
| Dry webs | 70 ± 3 | 64 ± 2 |
| Wet films | 89 ± 1 | 73 ± 2 |
| Wet webs | 91 ± 1 | 83 ± 8 |

The microphase morphologies of PCL-PEG TPUs at original state, deformed state and water-recovered state were characterized using wide angle x-ray scattering (WAXS). 2D WAXS patterns are shown in FIG. 14, and the corresponding diffractogram is shown in FIG. 15. There are three strong reflections in PCL-PEG copolymers, as shown in FIG. 14(a) through (i). Peak 1 is from the (120) reflection of the PEG monoclinic unit cell with d-spacing of 4.6 Å (2θ=19.3°), and Peak 2 is attributed to the (110) plane of the PCL orthorhombic unit cell with d-spacing of 4.1 Å(2θ=21.5°). Peak 3 is located at 2θ=23.5°, corresponding to d-spacing of 3.8 Å. It is the superposition of (200) planes of PCL crystallites and diverse PEG reflections. The diffraction images of the original bulk film and e-spun web, see FIG. 14(a-i) and 14(b-i), show uniform intensity distributions for all three rings, suggesting that the PCL and PEG crystallites have no preferred orientation after hot-press molding or electrospinning. After stretching at RT, Peak 1 and 2 of dry film showed strong equatorial orientation bands, indicating that both PEG and PCL crystallites were deformed and oriented preferentially parallel to the direction of strain, as seen in FIG. 14(a-ii). Peak 3 showed orientation bands at several azimuthal angles, belonging to diverse PEG plane. After water recovery and complete drying (S/F/R/D), the orientation bands for all three peaks became wider, indicating partial recovery (FIG. 14(a-iii). The PEG phase completely recovered in water; however upon drying, the PEG block recrystallized in a confined space of orientated PCL phase, which led to the orientation of the PEG phase.

Comparing with the dry film (S/F, FIG. 14(a-ii), it is observed that Peak 1 decreased in breadth in the wet film (S/F, FIG. 14(c-ii), indicating higher orientation of PEG phase, corresponding to larger strains and therefore higher fixing ratio, as seen in Table 5. Quite interestingly, the PCL reflection (Peak 2) was almost isotropic, with very weak intensity maximum located on the equator. This observation agrees well with the original "hydrogel shape memory" hypothesis, as seen in FIG. 9. The orientation of both phases after water recovery (S/F/R/D, FIG. 14(c-iii) was attributed to the microstructure reconstruction during recrystallization, as discussed before. The three peaks for the dry web at the stretched state show weak equatorial intensity maximums, suggesting a slightly preferred orientation of both blocks parallel to the stretching direction, as seen in FIG. 14(b-ii). The lower orientation for the dry web is thought to result from the imperfect fiber orientation after stretching. Comparing the dry web (S/F, FIG. 14(b-ii) with wet web in the stretched state (S/F, FIG. 14(d-ii), the PEG phase (Peak 1) of wet web was much more oriented than that of the dry web, while the degree of orientation of their PCL phases did not exhibit significant difference. Again, this observation confirmed our hypothesis and is consistent with the higher $R_f$ of the wet web. The higher recovery ratios of wet web and wet film were reflected in a lower degree of orientation of both crystalline phases at the recovered state (S/F/W/D). The intensity for each reflection was plotted versus azimuthal angle and the results are given in FIG. 16. The crystal orientation was further quantified using Herman's orientation function (f) and full-width at half maximum (FWHM) of the azimuthal spread, shown in FIG. 17. It is noted that no peaks shifted position in the intensity versus two theta traces, indicating that the d-spacing of all reflections remained the same at different states or by using different deformation methods (dry-stretch or wet-stretch), as seen in FIG. 18.

The behaviors of hot-pressed films were investigated by varying film thickness to elucidate the water-induced recovery mechanism of PCL-PEG TPUs. A light weight (m=3 g, corresponding to a stress of 52 kPa) was hung on one end of samples strained as previously described to keep them straight during recovery. Specimens were vertically immersed into water for recovery and the whole recovery process was captured by a high-speed camera. Time "0" was taken when the lower end of the sample first touching water. The recovery profiles of pre-stretched films with different thicknesses are shown in FIG. 18(a). The recovery time decreased from 300 s to 20 s by decreasing the film thickness from 430 μm to 100 μm. The recovery data were further analyzed by fitting the datasets shown in FIG. 17(a) with a standard sigmoidal function:

$$R(t) = R_0 + \frac{R_\infty}{1 + e^{-(t-t_0)/\tau}} \quad (5)$$

where $R_\infty$, $R_0$, $t_0$ and T are the four fitting parameters. The fit curves are shown as the solid lines in FIG. 9a with $R^2$ values from 0.991 to 0.998. Log τ was plotted with Log d (here d is the thickness of the films), and the slope was found to be 2, as seen in FIG. 17(b).
Considering:

$$\tau = k^* d^2 / D$$

it is apparent that water recovery of the present TPUs system is diffusion-limited.

Finally, the recovery kinetics of micro-fibrous webs was investigated to test the hypothesis that a reduction of the diffusion length to micro scale leads to the substantial increase in the water triggering recovery speed. The recovery behaviors of bulk films are shown for comparison. Four specimens tested here (dry film, dry web, wet film and wet web), were programmed based on the method described in FIG. 11. We observed that the elongated dry film completed recovery in 45 s with a recovery ratio of 42%, as seen in FIG. 19(a). When changing the material structure from bulk film to micro fibers, remarkably, the recovery time ($t_r$, time taken for the shape recovery) significantly decreased to 1.3 s by decreasing the diffusion distance substantially FIG. 19(b). By changing the programming method from "dry drawing" to "wet drawing", the film exhibited a slower recovery speed ($t_r$=60 s), as seen in FIG. 19(c), which is attributed to higher strain stored in the wet film. Comparing the recovery profiles of the wet web, as seen in FIG. 19(d), with the dry web, the recovery speed of the wet web was significantly slower ($t_r$=25 s).

This observation may be the result of two effects. First is the higher fixing ratio of the wet web. The higher fixing ratio leads to a more oriented fiber morphology, as shown in FIG. 20. Another important reason is that upon water absorption, the surface tension of water pulled the fibers together; therefore a more compact fiber morphology formed (i.e. lower degree of porosity), as seen in FIG. 20(b), potentially slowing water penetration. Instead of presenting a typical "S" shape as other shape memory systems, the wet web sample showed a "two-stage" recovery, where first stage ended at around 20% of total recovery time, as seen in FIG. 19(d). It is thought that during the first stage, the water molecules permeated into the matrix of the fibrous mats through the pores, resulting in a small amount of recovery (15%); during the second stage, water penetrated into fibers by diffusion, where most of the recovery completed. It is noted that some sample recovery occurred during the immersion process. Due to the strikingly fast recovery, the second data point for the dry web was collected when the upper end of the specimen was fully immersed in water, in order to reflect the recovery behavior of the whole sample, as seen in FIG. 19(b). In other words, the time gap between the first and second data point for the dry web depends on immersion (dunking) speed. Screen shots of real-time movies of recovery of all four samples can be seen in FIG. 21. It is expected that smaller fiber diameters yield mats with lower porosity and smaller pore size, which would result in slower recovery.

Water responsive shape memory polymers (SMP), PCL-PEG TPUs, have been demonstrated to feature controllable recovery speed, with the recovery time varying from 1.3 s to 5 min by changing the material form (bulk film vs. e-spun webs) and the sample thickness. The water uptake of this series of materials was tailored from 26% to 311% by varying the composition. The fixing and recovery ratios could be greatly improved by deforming the materials in the hydrogel state and later fixed via PEG recrystallization during drying. X-ray analysis proved that for the hydrogel samples, the hydrophobic PCL phase underwent limited deformation during stretch which later benefited the recovery. The new "hydrogel shape memory" cycle is expected to be applicable to any shape memory hydrogel system. Owing to its fast and controllable actuation, and high recoverable strain, this class of SMPs offers great potential for applications encompassing water responsive sensors, actuators, and medical devices.

The materials and method used in connection with the present invention are explained below.

Synthesis and Molding

The synthesis and characterization of high molecular weight PCL-PEG multiblock hybrid thermoplastic polyurethanes has been previously described. Multiblock thermoplastic polyurethanes (TPUs) were synthesized from polycaprolactone (PCL) diol, polyethylene glycol (PEG), and lysine methyl-ester diisocyanate (LDI). A one-step method was used to synthesize the TPUs. Before each reaction, LDI (Kyowa Hakko Chemical Co., Ltd.) was purified by vacuum distillation. PEG (10 kg/mol, Fluka, Inc.) was purified by preparing a THF solution, precipitating into n-hexane several times and then filtering. These steps were repeated several times. The purified powder was then dried in a vacuum oven at room temperature overnight. PCL diol (10 kg/mol, Sigmae-Aldrich, Inc.) was used without further purification. As a representative example, we describe the detailed procedure to prepare [PEG]$_{50}$-[PCL]$_{50}$. In a 250 mL three-neck flask, 5.0 g (0.5 mmol) PCL diol and 5.0 g (0.5 mmol) PEG were dissolved in 100 mL dried toluene (Fisher, ACS Certified). Under the protection of gaseous nitrogen purge, the flask was heated to 50° C. After heating at 50° C. for half an hour, the solution became transparent, indicating that both PCL diol and PEG had completely dissolved in toluene. Then 0.183 mL (1 mmol) of purified LDI (r ¼ 1.157 g/mL) and 3e5 drops of dibutyltin dilaurate catalyst (SigmaeAldrich) were added through a syringe into the 10 wt-% toluene solution. The reaction mixture was further heated to 90° C. and kept at 90° C. for ca. 8 h. The resulting toluene solution was then precipitated into a 6-fold excess of n-hexane, and washed with deionized water. The obtained products were then dried under vacuum for one week at room temperature for further processing and characterization.

The molecular weight of both PEG and PCL blocks was kept at 10 kg/mol for all the polymers, and this characteristic is not designated in the sample nomenclature for simplicity. Molecular weights other than 10 k for each block (PCL and PEG) are anticipated to behave in a similar manner, as long as the value is sufficiently large to enable melting a melting temperature for each that is greater than room temperature. Thus, it is anticipated that molecular weights for the polyols (PCL and PEG) ranging from 2 kDa to as large as 100 kDa, each, will function in a similar manner.

The feed molar ratios of PCL/PEG blocks are indicated as subscripts in the naming system. As an example, [PCL]$_{50}$-[PEG]$_{50}$ designates a multi-block copolymer consisting of PCL (10 kg/mol) and PEG (10 kg/mol) blocks with a feed weight percent ratio of 50:50. Films were made from as-synthesized polymers using a Carver 3851-0 hydraulic press with custom, temperature-controlled heating platens. In particular, polymer powder was sandwiched between two Teflon sheets with a Teflon spacer placed in between the sheets. A compressive stress of 0.4 MPa was applied at 90° C. and held for 30 seconds. Then, the platens were cooled to room temperature (RT), assisted by cooling water, following which the compressive stress was released. Teflon spacers with different thicknesses were used to control the thickness of the films, which were later determined using a digital caliper.

Electrospinning

Electrospinning solutions were prepared by dissolving PCL-PEG TPUs (0.8 g) in a mixed THF/DMF solvent ($V_{THF}$: $V_{DMF}$=1:1, $V_{total}$=8 mL). The electrospinning setup consisted of a syringe pump (KDS100, KD Scientific), a high voltage power supply unit (modulated by a low voltage, Agilent E3630A DC power supply), and a custom-made rotating drum collector. A voltage of 13 kV, a flow rate of 0.3 mL/h and a needle-to-collector distance of 10 cm were used. Aluminum foil was placed on the drum for fiber collection. The drum, with diameter of 5 cm, was rotated at 400 rpm with a slow lateral translation over a distance of 5 cm, yielding mats with relatively uniform thickness. Samples for microscopy were coated with gold using a Denton Vacuum-Desk II gold sputter coater and the surface morphology was investigated using a JEOL JSM5600 scanning electron microscope (SEM) instrument.

Swelling Measurements

To characterize the swelling behavior of the hot-press films and e-spun webs in water, samples were cut into square pieces with typical dimensions of 10 mm×10 mm, and were then immersed in water at room temperature. Then, the samples were taken out and patted dry. Water uptake and volume expansion were quantified using Eqn. 1 and Eqn. 2:

$$\text{Water uptake (\%)} = \left(\frac{m_w - m_d}{m_d}\right) \cdot 100 \quad (1)$$

$$\text{Volume expansion (\%)} = \left(\frac{V_w - V_d}{V_d}\right) \cdot 100 \quad (2)$$

where $m_d$ and $V_d$ are the mass and volume of the original dry films, and $m_w$ and $V_m$ are the mass and volume of the wet samples, respectively. Average values for three samples (n=3) are reported herein, with the error bars indicating one standard deviation.

Mechanical Properties

The ultimate tensile properties of films and e-spun webs, in both dry state and hydrogel (wet) state, were studied using a Linkam TST-350 tensile testing system with a 20 N (0.01 N resolution) load cell at room temperature. Each sample was punched into a dogbone geometry using an ASTM Standard D638-03 Type IV (scaled down by a factor of 4). This dogbone geometry was employed for all the following mechanical testing and shape memory characterization unless otherwise mentioned. For hydrogel testing, samples were immersed in water until they reached equilibrium prior to cutting with the dogbone die. Sand paper was used to increase the friction between the hydrogels and the clamps so that no slipping occurred during the measurements. Samples were extensionally deformed with a crosshead speed of 200 μm/s (192%/min) at room temperature until fracture occurred. Young's modulus was calculated by finding the initial slope of the stress versus strain curve ($0<\epsilon<10\%$) using linear regression. The ultimate stress was reported as the highest stress in the stress-strain curve, and the strain-at-break was recorded as the strain at the point where the force became zero. The experiment was repeated three times for each material, with typical results presented graphically and average values reported.

Microstructural Characterization

The microstructure of the samples in the deformed and recovered states were studied using wide angle X-ray scattering (WAXS) with a Rigaku S-MAX3000 (Woodlands, Tex.). A MicroMax-002+ High-Intensity Microfocus Sealed Tube X-ray Generator was used to produce a beam of collimated Cu Kα x-ray radiation with a wavelength of 1.5405 Å. An accelerating voltage of 45 kV and a current of 0.88 mA were applied. The scattered X-ray patterns were collected using a FujiFilm FLA7000 reader. The distance between sample and image plate was fixed at 120 mm for WAXS collection and exposure times of 30 min were utilized. Samples were exposed under vacuum to eliminate air exposures.

Water-triggered Shape Memory Characterization

Samples for water-triggered shape memory testing were deformed using Linkam tensile tester. Specimens were stretched at room temperature to a strain of $\epsilon_m$ at a rate of 192%/min. The strain was then decreased at 192%/min until the force reached zero, after which a large percentage of plastic strain remained ($\epsilon_u$). Shape recovery was then induced by immersing the deformed samples in water at RT for 10 min to a recovered strain, $\epsilon_r$, which was calculated using $\epsilon_r=(L_r-L_0)/L_0*100$, where $L_r$ is the gauge length of the recovered sample, and $L_0$ is the gauge length of the original sample (6.25 mm here). The fixing ($R_f$) and recovery ($R_r$) ratios were calculated using Eqn. 3 and Eqn. 4. The experiment was conducted three times per material.

$$R_f = \left(\frac{\varepsilon_u}{\varepsilon_m}\right) \cdot 100 \qquad (3)$$

$$R_r = \left(\frac{\varepsilon_u - \varepsilon_r}{\varepsilon_u}\right) \cdot 100 \qquad (4)$$

To characterize the recovery kinetics, pre-stretched samples were placed into RT water with a light screw (3 g) hung on one end of the samples to keep the samples straight during recovery. A high speed camera (Fastcam-512PCI, Photron) with a sampling rate of 60 or 250 frames per second was used to image samples during recovery. Recovery ratios ($R_r$) were calculated by Eqn. 4, where $L_r$ of selected frame was measured using ImageJ software (1.44 p).

17. The shape memory polymer of claim 1, having the structure:
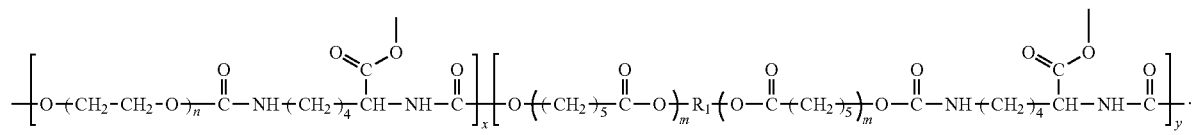

What is claimed is:

1. A shape memory polymer, comprising a thermoplastic polyurethane consisting of the reaction product of poly(ε-caprolactone), poly(ethylene glycol), and lysine-derived diisocyanate, wherein the molecular weight of each of the poly(ε-caprolactone) and the poly(ethylene glycol) is 10,000 g/mol.

2. The polymer of claim 1, wherein said poly(ε-caprolactone) and poly(ethylene glycol) are present in a feed weight percent ratio of 70:30.

3. The polymer of claim 1, wherein said poly(ε-caprolactone) and poly(ethylene glycol) are present in a feed weight percent ratio of 60:40.

4. The polymer of claim 1, wherein said poly(ε-caprolactone) and poly(ethylene glycol) are present in a feed weight percent ratio of 50:50.

5. The polymer of claim 1, wherein said poly(ε-caprolactone) and poly(ethylene glycol) are present in a feed weight percent ratio of 40:60.

6. The polymer of claim 1, wherein said poly(ε-caprolactone) and poly(ethylene glycol) are present in a feed weight percent ratio of 30:70.

7. A method of triggering shape memory behavior in a polymer, comprising the steps of:

providing a thermoplastic polyurethane consisting of the reaction product of poly(ε-caprolactone), poly(ethylene glycol), and lysine-derived diisocyanate, wherein the molecular weight of each of the poly(ε-caprolactone) and the poly(ethylene glycol) is 10,000 g/mol;

deforming said thermoplastic polyurethane; and exposing said thermoplastic polyurethane to water.

8. The method of claim 7, wherein said poly(ε-caprolactone) and poly(ethylene glycol) are present in a feed weight percent ratio of 70:30.

9. The method of claim 7, wherein said poly(ε-caprolactone) and poly(ethylene glycol) are present in a feed weight percent ratio of 60:40.

10. The method of claim 7, wherein said poly(ε-caprolactone) and poly(ethylene glycol) are present in a feed weight percent ratio of 50:50.

11. The method of claim 7, wherein said poly(ε-caprolactone) and poly(ethylene glycol) are present in a feed weight percent ratio of 40:60.

12. The method of claim 7, wherein said poly(ε-caprolactone) and poly(ethylene glycol) are present in a feed weight percent ratio of 30:70.

13. The method of claim 7, wherein said thermoplastic polyurethane has a first predetermined shape prior to deforming.

14. The method of claim 13, wherein said thermoplastic polyurethane has a second predetermined shape after deforming.

15. The method of claim 14, wherein said thermoplastic polyurethane returns to said first predetermined shape after exposing said thermoplastic polyurethane to water.

16. The shape memory polymer of claim 1, wherein the polyurethane has a recovery time of 1.3 seconds when programmed by dry drawing.